Jan. 20, 1970     R. ROMES     3,490,322
CUTTING MACHINE AND CONTROL MECHANISM THEREFOR
Filed March 13, 1968
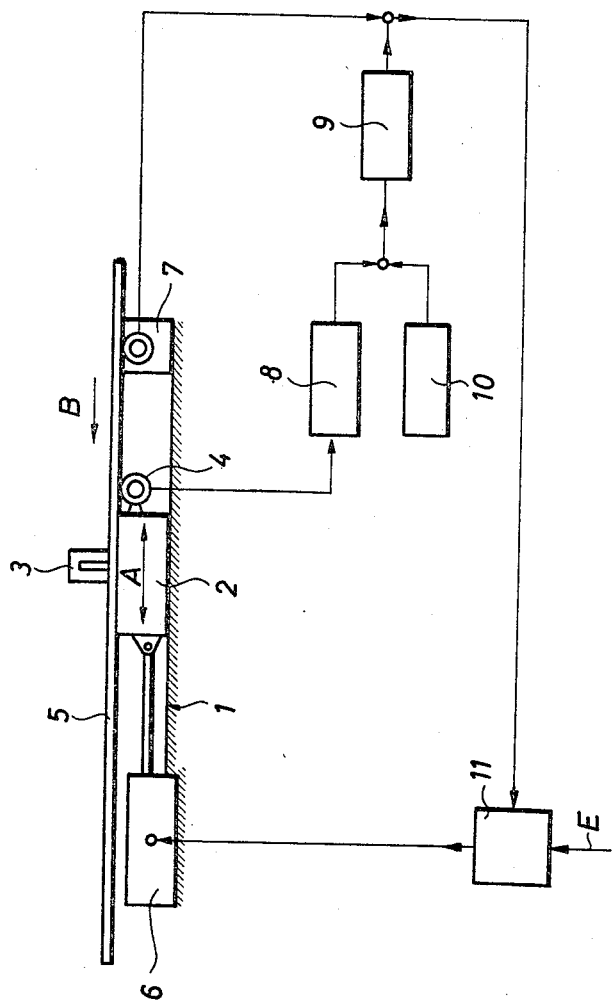
INVENTOR
Roman Romes
By
Watson, Cole, Grindle + Watson
Attys United States Patent Office 3,490,322
Patented Jan. 20, 1970

3,490,322
CUTTING MACHINE AND CONTROL
MECHANISM THEREFOR
Roman Romes, 7 Tannenackerweg,
8770 Lohr (Main), Germany
Filed Mar. 13, 1968, Ser. No. 712,645
Claims priority, application Germany, Mar. 16, 1967,
J 33,229
Int. Cl. B23d 25/04
U.S. Cl. 83—76                                   4 Claims

ABSTRACT OF THE DISCLOSURE

A cutting machine, especially for cutting strip material or rod stock of different predetermined lengths while traveling, which comprises a tool carriage which is driven by a drive mechanism and carries a cutting tool, and means for insuring that at the desired cutting position the tool carriage will travel at the identical speed as the material to be cut.

---

The present invention relates to a cutting machine including a mechanism for controlling the operation of this machine, especially for cutting strip material and rod stock of different predetermined lengths while traveling. This machine comprises a traveling tool carriage which is driven by a controlled drive unit and carries a cutting tool, and a measuring element which is driven by the traveling material to be cut and is connected to a feed-responsive impulse transmitter the impulses of which are transmitted to a preadjustable counter which, in turn, produces an impulse for operating or controlling the driving unit.

It is an object of the present invention to provide a cutting machine of the type as mentioned above which is provided with a mechanism for controlling the cutting operations by being designed so as to permit the travel of the tool carriage to be synchronized with that of the workpiece when reaching the place to be cut and also to permit the position of the tool carriage to be regulated relative to the workpiece.

According to the invention, this object is attained by mounting the measuring element on the tool carriage, by providing a tacho-generator which is mounted in a fixed position and is to be driven by the material to be cut, by negatively superimposing the voltage which is controlled by the counter upon the voltage which is produced by the tacho-generator, and by employing the sum of these voltages for controlling the operation of the driving element of the tool carriage. Another feature of the invention consists in providing a low-inertia measuring element, preferably in the form of a measuring roller, for measuring the distance traveled by the material in the form of electric impulses and for transmitting these impulses to the counter. By means of such a measuring element and by directly determining the actual speed of the material by means of the tacho-generator, the apparatus according to the invention permits the occurring values to be determined by voltages and these voltages then to be further transmitted to the driving element of the tool carriage for controlling the operation thereof. Since these measurements are practically not affected by inertia or play, they are very accurate. Consequently, the apparatus according to the invention permits a high speed of travel of the material and a high cutting frequency and thus results in a high cutting output.

The desired lengths to which the material is to be cut may be adjusted very easily either by hand or by means of a programme transmitter and such adjustments may also be made during the operation of the machine especially if the counter is provided in the form of a digital counter and is connected in series with a digital analog computer which is connected to the control circuit which is supplied with current by the tacho-generator.

The features and advantages of the present invention will become more clearly apparent from the following detailed description thereof which is to be read with reference to the accompanying drawing which illustrates diagrammatically a cutting machine according to the invention.

As may be seen in the drawing, this machine comprises a slideway 1 along which a tool carriage 2 which carries a cutting tool 3 is slidable back and forth in the direction of the double-arrow A. The tool carriage 2 carries a measuring wheel 4 which is adapted to engage directly and without play with the material 5 to be cut, for example, a strip of sheet metal, so as to be driven by the material 5 when the latter is moved in the direction of the arrow B.

The tool carriage 2 is connected to and may be driven by a suitable driving element 6, for example, a double-acting hydraulic cylinder unit, the driving speed of which may be varied by means of a built-in speed governor. At the other side of the tool carriage 2, a tacho-generator 7 is mounted in a fixed position on the slideway 1 and provided with a roller which like the measuring wheel 4 is in direct engagement without play with the material 5 to be cut so as to be driven thereby.

The voltage produced by the tacho-generator 7 is supplied to the speed governor 11 which controls the amount of energy E which is supplied to the driving element 6 for operating the same. The rotation of the measuring wheel 4 produced by the relative movement of the tool carriage 2 and the material 5 results in electrical impulses which are transmitted to and counted by a digital counter 8 which is connected via a digital analog computer 9 to the control circuit between the tacho-generator 7 and the speed governor 11. Counter 8 is further connected in parallel to a preselector 10 which may be adjusted in accordance with the desired length of the material to be cut.

At the beginning of each work cycle of the machine, the tool carriage 2 is located adjacent to the tacho-generator 7. The material 5 which is being fed continuously drives the tacho-generator 7 and the measuring wheel 4 without play. The feed-responsive impulse transmitter which is coupled with the measuring wheel 4 is designed so as to transmit impulses which indicate the relative distance traveled by the material 5 and also the direction in which the measuring wheel 4 is driven. The counter 8 to which these impulses are transmitted then adds or subtracts them depending upon the direction of rotation of measuring wheel 4. The indication of the counter 8 thus corresponds to the distance of the intended place to be cut on the material 5 from the cutting tool 3. The digital analog computer 9 then produces a voltage which is in proportion to the indication of the counter 8 and decreases toward zero in the direction toward the place to be cut. As soon as this voltage decreases below the voltage produced by the tacho-generator 7, the speed governor E will be operated which then starts the tool carriage 2. When the indication of counter 8 reaches the zero value, the voltage of the tacho-generator 7 will be fully effective, and the material 5 and the tool carriage 2 will then move synchronously. As soon as synchronism between the movements of the material 5 and tool carriage 2 occurs, the place to be cut is determined and a control impulse is transmitted from the counter which then indicates the value of zero. This control impulse activates the cutting tool 3 which then cuts off the material 5. As soon as a piece of the desired length has been cut off the material 5, the driving element 6 will shift the tool carriage 2 back to its original position in the direction toward the tacho-generator 7. When the cutting operation is completed, counter 8 is again adjusted by impulses to the cutting length as preset on the preselector 10. The operation of measuring the length of the following piece of material to be cut will start already during the return movement of the tool slide 2.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A cutting machine for cutting traveling materials to different predetermined lengths comprising a tool carriage, a cutting tool on said carriage, driving means for driving said tool carriage, measuring means driven by the material to be cut and mounted on said tool carriage and comprising a feed-responsive impulse transmitter for producing electric impulses in accordance with the distance traveled by the material between two successive cutting positions, means for producing a voltage in proportion to the number of said impulses, a tacho-generator mounted in a fixed position and driven by said material, circuit means for superimposing said voltage upon the voltage produced by said tacho-generator, and means connected to said circuit means and controlled by the sum of said voltages for controlling the operation of said driving means.

2. A cutting machine as defined in claim 1, wherein said impulse transmitter comprises a measuring roller in engagement with and driven by the material to be cut.

3. A cutting machine as defined in claim 1, wherein said voltage-producing means comprise a digital counter and a digital analog computer connected in series with said digital counter and connected to said circuit means.

4. A cutting machine as defined in claim 2, further comprising a preselector connected in parallel to said counter and adapted when one cutting operation of said cutting tool is completed to adjust said counter to a preselected length of the material to be cut before said tool carriage returns to its original position.

References Cited

UNITED STATES PATENTS

| 3,081,657 | 3/1963 | Harris | 83—320 X |
| 3,178,974 | 4/1965 | Roess | 83—318 X |
| 3,276,647 | 10/1966 | Lewis, et al. | |
| 3,310,855 | 3/1967 | Orioli | 83—295 X |

WILLIAM S. LAWSON, Primary Examiner

U.S. Cl. X.R.
83—295, 311, 320